US007696471B2

(12) United States Patent
Ogisu et al.

(10) Patent No.: US 7,696,471 B2
(45) Date of Patent: Apr. 13, 2010

(54) IMPACT DETECTION SYSTEM USING AN OPTICAL FIBER SENSOR

(75) Inventors: Toshimichi Ogisu, Tokyo (JP); Noritsugu Nakamura, Tokyo (JP); Nobuo Takeda, Tokyo (JP)

(73) Assignees: Fuji Jukogyo Kabushiki Kaisha, Shinjuku-ku, Tokyo (JP); The University of Tokyo, Bunkyo-ku, Tokyo (JP)

( * ) Notice: Subject to any disclaimer, the term of this patent is extended or adjusted under 35 U.S.C. 154(b) by 0 days.

(21) Appl. No.: 11/987,533

(22) Filed: Nov. 30, 2007

(65) Prior Publication Data

US 2008/0128600 A1    Jun. 5, 2008

(30) Foreign Application Priority Data

Dec. 1, 2006    (JP)    ............... 2006-326013

(51) Int. Cl.
G01J 1/04    (2006.01)
G01J 1/42    (2006.01)
G01J 5/08    (2006.01)
(52) U.S. Cl. .................. 250/227.14; 385/13; 385/37
(58) Field of Classification Search ............ 250/227.14, 250/227.15, 227.16; 340/550, 555, 541; 385/14, 12, 13, 31, 37, 88, 92, 129–132
See application file for complete search history.

(56) References Cited

U.S. PATENT DOCUMENTS

| | | | |
|---|---|---|---|
| 5,564,832 A | 10/1996 | Ball | |
| 5,814,729 A | 9/1998 | Wu et al. | |
| 5,898,502 A * | 4/1999 | Horiuchi et al. | 356/416 |
| 6,366,378 B1 * | 4/2002 | Tervonen et al. | 398/87 |
| 6,525,308 B1 * | 2/2003 | Schmidt-Hattenberger | 250/227.23 |
| 2003/0118286 A1 * | 6/2003 | Kamei et al. | 385/37 |
| 2004/0096158 A1 * | 5/2004 | Yoneda | 385/37 |
| 2006/0070446 A1 * | 4/2006 | Tam et al. | 73/705 |

FOREIGN PATENT DOCUMENTS

| | | |
|---|---|---|
| EP | 1 519 181 A1 | 3/2005 |
| JP | 2005-98921 | 4/2005 |
| WO | WO 99/24790 | 5/1999 |
| WO | WO 2006/005960 A | 1/2006 |
| WO | WO 2006/036401 A2 | 4/2006 |
| WO | WO 2006/123068 A | 11/2006 |

OTHER PUBLICATIONS

Hiroaki Tsutsui et al., "Detection of impact damage of stiffened composite panels using embedded small-diameter optical fibers; Detection of damage of composites using embedded optical fibers" Dec. 1, 2004, Smart Materials and Structures, IOP Publishing Ltd., Bristol, GB, pp. 1284-1290, XP020072545 ISSN: 0964-1726.
European Search Report dated Mar. 23, 2009.

* cited by examiner

Primary Examiner—Thanh X Luu
Assistant Examiner—Francis M Legasse, Jr.
(74) Attorney, Agent, or Firm—McGinn IP Law Group, PLLC (57) ABSTRACT

Disclosed is an impact detection system including: an optical fiber including a plurality of sensor sections to reflect light, a wavelength band of the reflected light vibrates depending on an elastic wave propagating through a subject to be inspected; a light source to input light into the optical fiber; optical filters each connected to an output terminal of the optical fiber; and an arithmetic processing unit to detect the impact from output values of sensor sections, wherein the wavelength bands of the sensor sections in the optical fiber are distributed such that the vibration bands caused by the impact to be detected do not overlap with each other, and a pass band of the optical filter corresponding to one of the sensor sections is distributed in the vibration band caused by the detection object, and is distributed in both sides of a center of the wavelength band of the one sensor section.

20 Claims, 7 Drawing Sheets

IMPACT DETECTION SYSTEM USING AN OPTICAL FIBER SENSOR

BACKGROUND OF THE INVENTION

1. Field of the Invention

The present invention relates to an impact detection system using an optical fiber sensor.

2. Description of Related Art

In a field in which both the strength and the weight saving of a material of, for example, the airframe of an airplane are required, it is indispensable to widely apply a composite material such as a carbon fiber reinforced plastic (CFRP) in order to meet the requirement of this kind.

As an apparatus for performing the detection of damage, a defect, and the like, of such a composite material, Japanese Patent Application Laid-Open Publication No. 2005-98921 describes a damage detecting apparatus using a fiber Bragg grating (FBG) optical fiber sensor. The thinning of the diameter of an optical fiber has advanced recently (for example, to be a diameter of 52 µm), and, if the optical fibers are embedded in a structure, the lowering of the strength of the structure is scarcely produced. Consequently, the optical fiber has the advantage that the degree of freedom of the installation thereof is high.

The invention described in the Japanese Patent Application Laid-Open Publication No. 2005-98921 detects the damage of a composite material on the basis of a change of the output of characteristic detecting means by vibrating the composite material with a piezo-element. The invention uses the following components for the detection of the damage: the piezo-element fixed to be disposed at a predetermined position of a composite material structure; a lead wire to transmit a signal to the piezo-element; the optical fiber sensor fixedly disposed so that the composite material constituting the composite material structure is put between the optical fiber sensor and the piezo-element, which sensor has a grating portion reflecting a light of a predetermined wavelength on a core portion; a light source performing the radiation of a light to a core portion; and the characteristic detecting means for detecting the characteristics of the reflected light from the grating portion. Moreover, a spectrum analyzer or the like to detect the frequency characteristic of the reflected light from the grating portion is used as the characteristic detecting means.

However, the invention described in the Japanese Patent Application Laid-Open Publication No. 2005-98921 cannot specify the existence, the position, and the magnitude of an impact having an arbitrary magnitude when an object structure receives the impact at an arbitrary position on the structure because the invention aims to detect a damage and the piezo-element is accordingly disposed at a predetermined position. Because the vibration of a reflected light from the optical fiber sensor (grating portion) changes according to the magnitude of the impact and the distance from the impact (vibration source), the system loading a known vibration on the object structure by the piezo-element to detect the damage on the basis of the propagation result of the vibration cannot grasp all the changes from a change of a reflected light vibrating large to a change of a reflected light vibrating small, and cannot specify the existence, the position, and the magnitude of an arbitrary impact with high accuracy.

SUMMARY OF THE INVENTION

It is an object of the present invention to configure an impact detection system using an optical fiber sensor in view of the problem of the conventional technology described above.

According a first aspect of the invention, there is provided an impact detection system comprising: an optical fiber including a core portion, the core portion including a plurality of sensor sections each provided with a grating portion, in which the grating portion is provided with a plurality of gratings each reflecting light, wavelength band of reflected light changes when a distance between the adjacent gratings changes, and the optical fiber vibrates the wavelength band depending on an elastic wave propagating through a subject to be inspected; a light source to input light into the core portions of the optical fiber, in which a spectrum bandwidth of the light includes vibration bands of the wavelength bands of the sensor sections; optical filters each connected to an output terminal of the optical fiber from which output terminal the reflected light is output; and an arithmetic processing unit to perform arithmetic processing of output values of the plurality of sensor sections through the optical filters, so as to detect the impact to the subject, wherein the wavelength bands of the sensor sections in the optical fiber are distributed to be apart from each other such that the vibration bands do not overlap with each other, and a pass band of the optical filter corresponding to one of the sensor sections is distributed in the vibration band of the one sensor section, and is distributed in both sides of a center of the wavelength band of the one sensor section under no impact loaded.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DETAILED DESCRIPTION OF PREFERRED EMBODIMENTS

In the following, one embodiment of the present invention will be described with reference to the attached drawings. The following is one embodiment of the present invention and does not limit the present invention.

[Basic Configuration of Impact Detection System]

The basic configuration of an impact detection system is first described.

Figure 1:
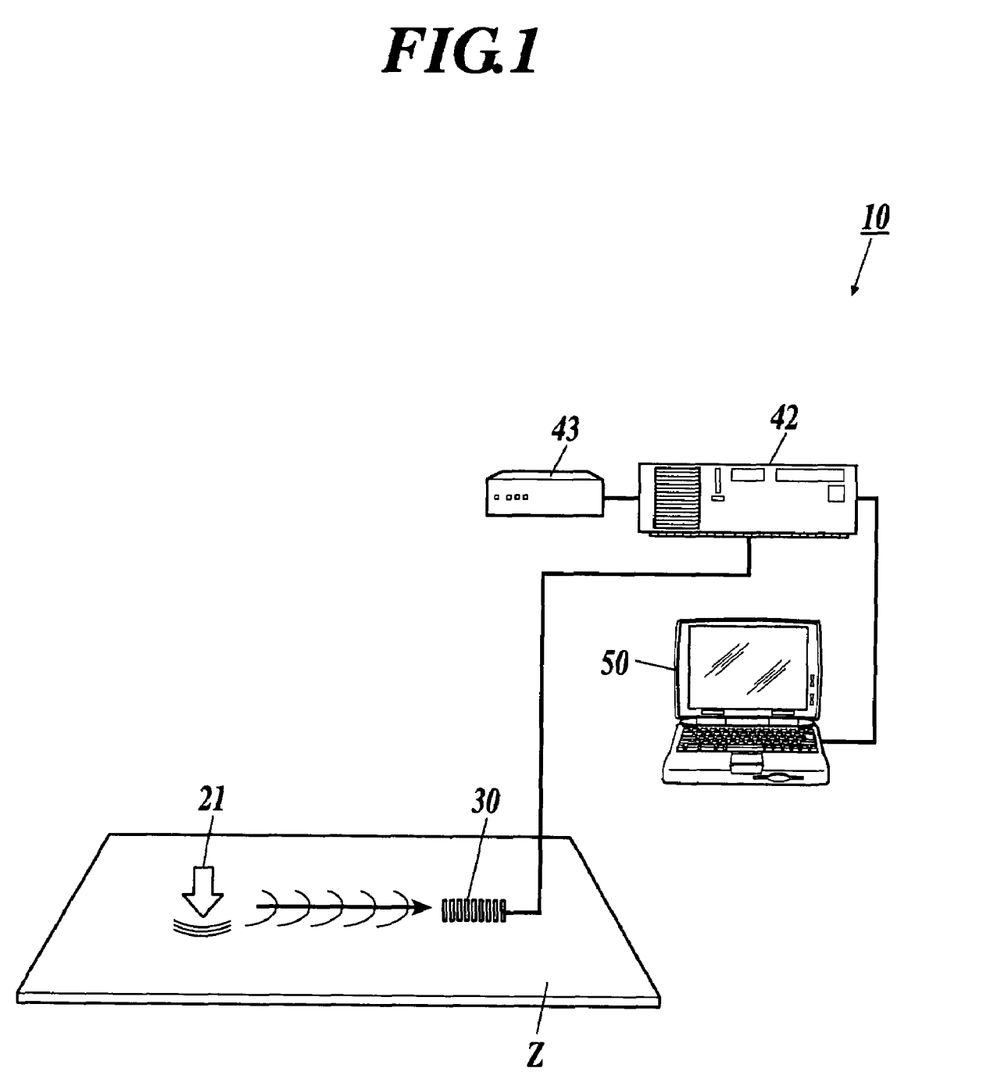
FIG. 1 is a schematic configurational view of a basic impact detection system.

FIG. 1 is a schematic configurational view of an impact detection system 10 to perform the detection of an impact to a composite material structure Z. In the present embodiment, the composite structure Z is used as a subject to be inspected.

As shown in FIG. 1, the impact detection system 10 of the present embodiment is equipped with optical fiber sensors (sensor sections) 30 installed at predetermined positions of the composite material structure Z, in which the detection of an impact 21 is to be performed, by being embedded or stuck; a spectrum analyzer 42 to detect the wavelength characteristics of reflected lights obtained from the optical fiber sensors 30; and an arithmetic processing apparatus 50 to performing the arithmetic processing of an output value of the spectrum analyzer 42. Moreover, a power supply device 43 of the spectrum analyzer 42 is shown.

Each of the optical fiber sensors 30 is a fiber Bragg grating (FBG) optical fiber sensor. As shown in the schematic configurational view of FIG. 2A, each of the optical fiber sensors 30 includes a grating portion 33 reflecting a light of a predetermined wavelength in the core portion 32 of the optical fiber sensor 30 to be formed as an optical fiber 34.

Figure 2A:
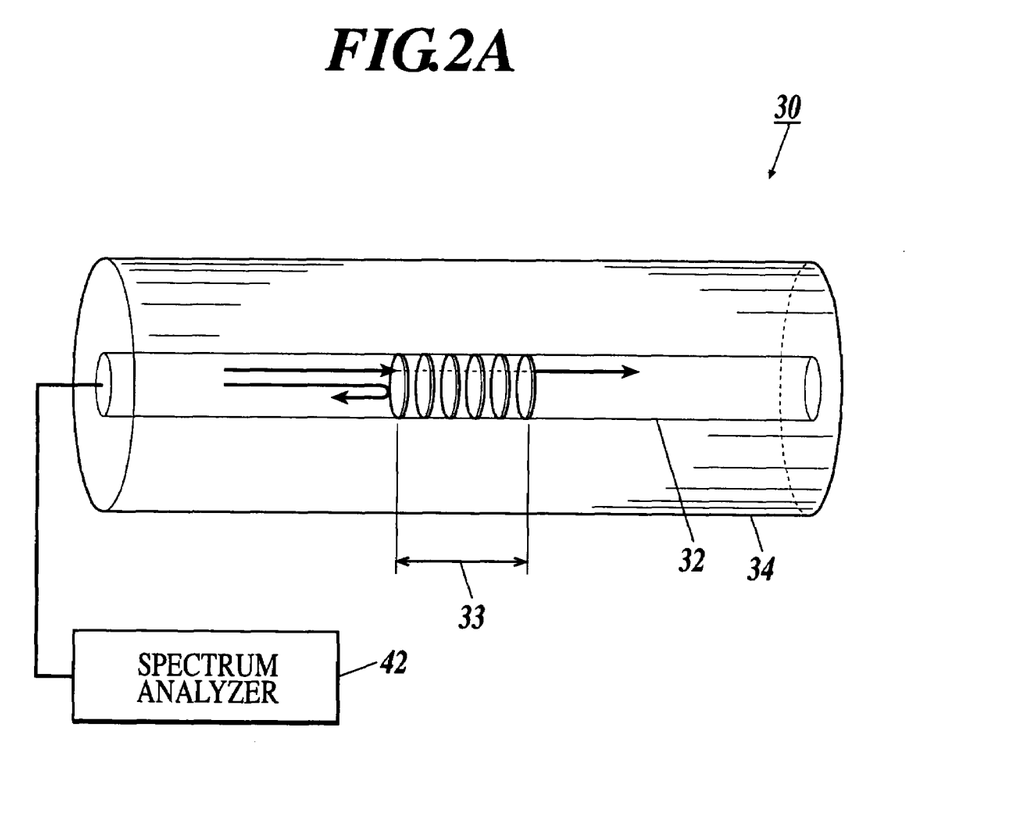
FIG. 2A is a schematic configurational view of an optical fiber sensor.

The optical fiber 34 is connected to the spectrum analyzer 42 at one end of the optical fiber 34, and irradiating lights covering the whole wavelength band of a predetermined range are entered into the core portion 32 by the light source provided in the spectrum analyzer 42. The lights entering from the spectrum analyzer 42 propagate through the core portion 32, and lights having only a part of wavelengths of the entering lights are reflected at the grating portion 33.

Figure 2B:
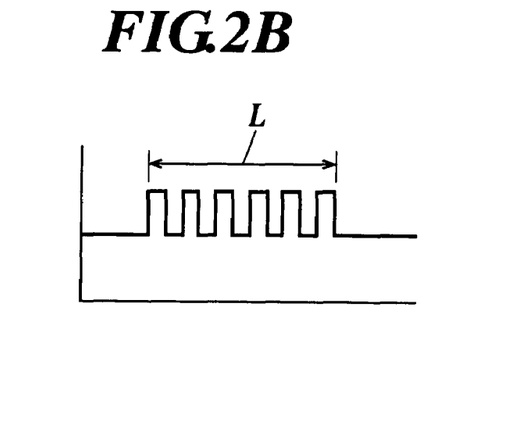
FIG. 2B is a diagram showing the changes of the refraction index of a grating portion in the traveling direction of a light.

FIG. 2B is a diagram showing the changes of a refraction index of the core portion 32 in the traveling direction of a light, and a range L in the figure shows the refraction index in the grating portion 33.

As shown in the figure, the grating portion 33 is formed so as to change the refraction index of the core portion 32 at a fixed period. The grating portion 33 selectively reflects only the light having a specific wavelength at the boundary parts where the refraction index changes. If a disturbance, such as strain caused by a vibration, is applied to the grating portion 33, then the grating intervals thereof change (expansion or contraction), and the wavelength of the reflected light thereby changes.

The wavelength change $\Delta\lambda_B$ of a reflected light of an FBG optical fiber sensor can be expressed here by the following formula, where n denotes the effective refractive index of the core, $\Lambda$ denotes a grating interval, $P_{11}$ and $P_{12}$ denote Pockels coefficients, $\nu$ denotes a Poisson ratio, $\epsilon$ denotes applied strain, $\alpha$ denotes the temperature coefficient of the fiber material, and $\Delta T$ denotes a temperature change (see Alan D. Kersey, "Fiber Grating Sensors," JOURNAL OF LIGHTWAVE TECHNOLOGY, Vol. 15, No. 8, 1997).

$$\Delta\lambda_B = 2n\Lambda\left(\left\{1 - \left(\frac{n^2}{2}\right)[P_{12} - \nu(P_{11} + P_{12})]\right\}\epsilon + \left[\alpha + \frac{\left(\frac{dn}{dT}\right)}{n}\right]\Delta T\right)$$

Consequently, when a vibration propagates to the grating portion 33, the strain amount $\epsilon$ of the grating portion 33 changes, and the wavelength of a reflected light changes according to the strain amount $\epsilon$ as a result. That is, the amount of change $\Delta\lambda_B$ of a wave length changes according to the magnitude of a vibration applied to the grating portion 33.

Figure 3A:
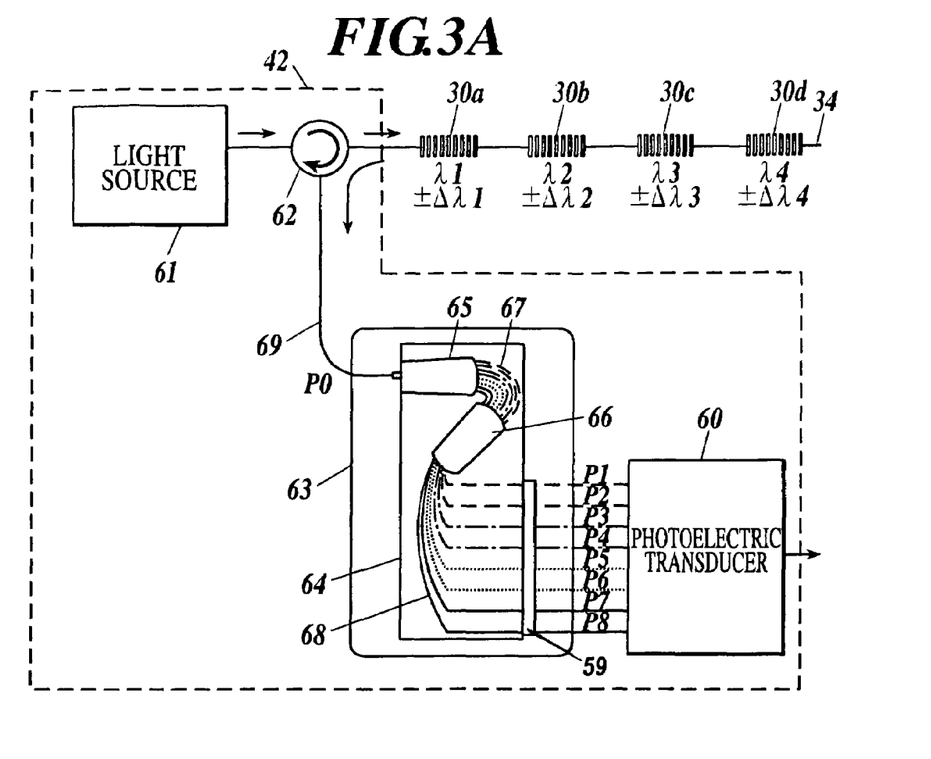
FIG. 3A is a configurational diagram showing the optical fiber sensor and a spectrum analyzer connected to the sensor.

FIG. 3A shows a configuration example of an optical fiber sensor and the spectrum analyzer 42 connected to it. As shown in FIG. 3A, the spectrum analyzer 42 includes a light source 61, an optical circulator 62, an arrayed waveguide grating (AWG) module 63, and a photoelectric transducer 60. In the present configuration example, the optical fiber 34 that is composed of four optical fiber sensors 30a-30d that have different reflection wavelengths from one another and are connected in series is connected to the spectrum analyzer 42. As the minimum configuration, three optical fiber sensors 30 are required.

The light source 61 is a wide band light source including a vibration band of reflection wavelengths of the optical fiber sensors 30a-30d. When the reflection wavelength characteristic of an optical fiber sensor changes to the outside of the wavelength band of the light source, no reflected lights are produced. Consequently, the wavelength band of the light source limits the detection range of vibrations. It is preferable to set the light source to have a sufficiently wide band in order that a perfect reflected light is always emitted even if the reflection wavelengths of the optical fiber sensors 30a-30d vibrate by an impact. The vibration band of the reflection wavelengths of an optical fiber sensor depends on the characteristics of the optical fiber sensor, an impact, the quality of the material of a subject to be inspected.

The optical circulator 62 causes a light from the light source 61 to travel to the side of the sensor sections 30a-30d of the optical fiber sensor 34, and guides the reflected lights returned from the sensor sections 30a-30d of the optical fiber sensor 34 to the input port P0 of the AWG module 63. The reflected light guided by the optical circulator 62 is introduced into the input port P0 of the AWG module 63 by an optical fiber 69.

The AWG module 63 includes an AWG board 64. A lightwave circuit monolithically integrated on a glass substrate by the technique of the optical waveguide is formed on the AWG board 64. The lightwave circuit on the AWG board 64 includes input and output slab waveguides 65 and 66, an arrayed waveguide 67, and an output waveguide 68, and constitutes eight optical filters that are connected to the input port P0 in parallel with one another and have respectively different pass bands. The lightwave circuit on the AWG board 64 separates the multiplexed-wavelength input light, into the lights having respective wavelengths, by distributing the input light to pass it through the eight optical filters 59, and outputs the lights in parallel with one another to eight output ports P1-P8. Here, the number of the output ports in practical use is not limited to eight.

Figure 3B:
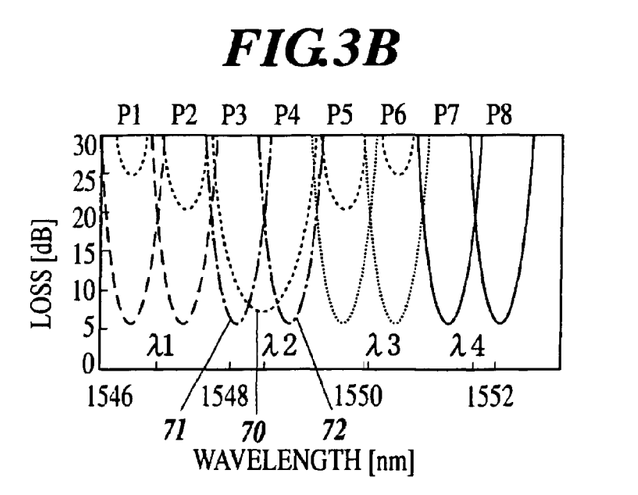
FIG. 3B is a spectrum diagram showing the pass bands of eight optical filters.

The pass bands of the respective optical filters 59 corresponding to the eight output ports P1-P8 are shown in the spectrum diagram of FIG. 3B. For example, an optical filter 59 passes the reflected light corresponding to the part in which the reflected light input distribution 70 of the reflected light from the sensor section 30b having a center wavelength λ2 in FIG. 3B overlaps with a pass band 71 of the optical filter, and outputs the passed reflected light to the output port P3. Furthermore, in parallel with the aforesaid reflected light, another optical filter 59 passes the reflected light corresponding to the part in which the reflected light overlaps with a pass band 72, and outputs the passed reflected light to the output port P4. The optical filters 59 made to correspond to the one optical fiber sensor section 30b are set as three optical filters or more.

For simplification, the operation of two optical filters to a reflected light from one sensor section 30 is described with reference to FIGS. 4A-4C.

Figure 4A:
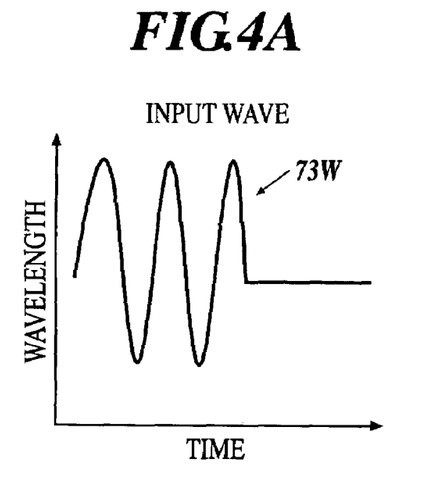
FIG. 4A is a diagram showing the waveform of an input wave into the optical filter.
Figure 4B:
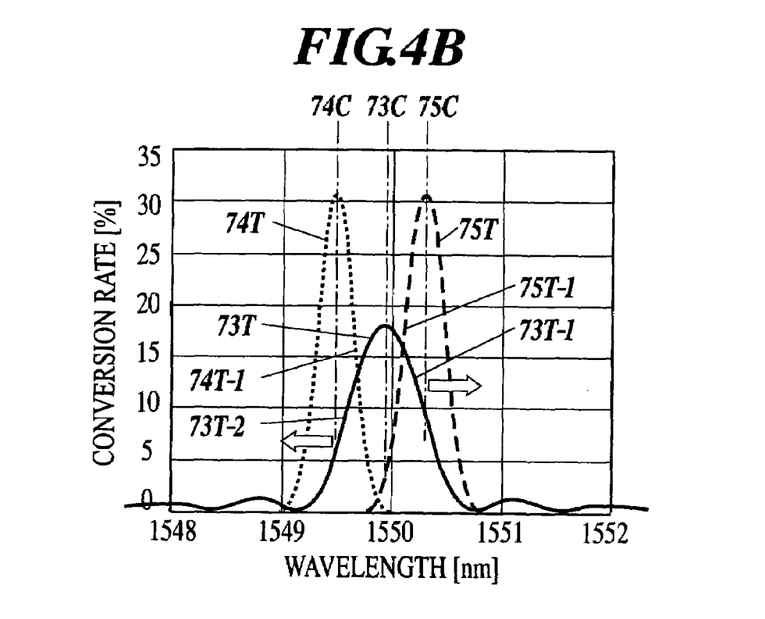
FIG. 4B is a spectrum diagram showing the pass band of two optical filters.

As shown in FIG. 4B, an input distribution 73T of the reflected light from the sensor section 30 appears. At the time of loading an impact, an elastic wave from an impact position as a vibration source position propagates through the composite material structure Z, and the sensor section 30 vibrates the wavelength of the reflected light to be output therefrom according to the elastic wave propagating through the composite structure Z. The vibration of the wavelength is shown as an input wave 73W of FIG. 4A.

According to the vibration of the wavelength, the reflected light input distribution 73T shown in FIG. 4B shifts to a higher and lower level alternately to vibrate, and the value of the wavelength repeats increase and decrease.

The higher optical filer passes the reflected light corresponding to the part where the reflected light input distribution 73T overlaps with a pass band 75T, and outputs the passed reflected light. Similarly, the lower optical filter passes the reflected light corresponding to the part where the reflected light input distribution 73T overlaps with the pass band 74T, and outputs the passed reflected light.

Consequently, when the value of the wavelength of the reflected light increases and the reflected light input distribution 73T shifts to the higher, the output value of the higher optical filter having the pass band 75T increases, and the output value of the lower optical filter having a pass band 74T decreases. Adversely, when the value of the wavelength of the reflected light decreases and the reflected light input distribution 73T shifts to the lower, the output value of the higher optical filter having the pass band 75T decreases, and the output value of the lower optical filter having the pass band 74T increases.

Figure 4C:
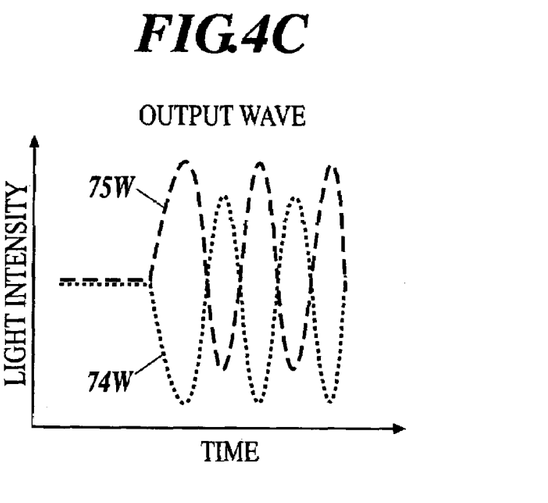
FIG. 4C is a diagram showing the waveforms of output waves of the optical filters.

Consequently, when the change of the center wavelength of a reflected light vibrates by the input wave 73W shown in FIG. 4A, the output value of the higher optical filter having the pass band 75T generates an output wave 75W shown in FIG. 4C, and the output value of the lower optical filter having the pass band 74T generates an output wave 74W shown in FIG. 4C. As shown in FIG. 4C, the output waves 74W and 75W become the waves having the phases in an inverse relation to each other.

The spectrum analyzer 42 shown in FIG. 3A outputs light waves to the output ports P1-P8 on the basis of the principle mentioned above, and the photoelectric transducer 60 converts the light waves into electric signals to output them to the outside. The outputs of the spectrum analyzer 42 receive the A/D conversion through a not shown interface, and are input into the arithmetic processing apparatus 50.

The arithmetic processing apparatus 50 performs the arithmetic processing for calculating the existence, the position, and the magnitude of an impact on the basis of the output values of the spectrum analyzer 42. Moreover, the arithmetic processing apparatus 50 performs the recording of the operation results.

The arithmetic processing apparatus 50 of the present embodiment is composed of an electronic computer. The arithmetic processing apparatus 50 is composed of, for example, a central processing unit (CPU) performing arithmetic processing in conformity with a program; a read only memory (ROM) storing the program; a random access memory (RAM) storing input value data from the spectrum analyzer 42, and the data in the operation processes in conformity with a program and the data of operation results; an interface performing the transmission and the reception of data with spectrum analyzer 42; an image output interface converting the display data of the operation results into an image signal of a suitable format to output the converted image signal to a display monitor; and a data bus performing the transmission of various instructions and data among the respective components mentioned above.

[Impact Detection System of One Embodiment of the Present Invention]

Next, the impact detection system of one embodiment of the present invention is described. The impact detection system of the embodiment of the present invention is composed of an optical fiber including a plurality of FBG optical fiber sensors, a spectrum analyzer, an arithmetic processing unit to be configured as follows.

It is supposed that the number of the optical filters corresponding to one optical fiber sensor is m (where m is an integer equal to 3 or more), and that the number of the optical fiber sensors to be used in one optical fiber is n (where n is an integer equal to 2 or more).

A (m×n) channel AWG module is used as the AWG module to be configured in the spectrum analyzer. That is, (m×n) optical filters, which have different pass bands and are connected in parallel to the input port P0, are configured in the AWG module, and the AWG module includes (m×n) output ports (output channels) corresponding to the respective optical filters.

A description is given here to the case where m=4 and n=10, as an example. Consequently, an AWG module of 40 channels is used.

Figure 5A:
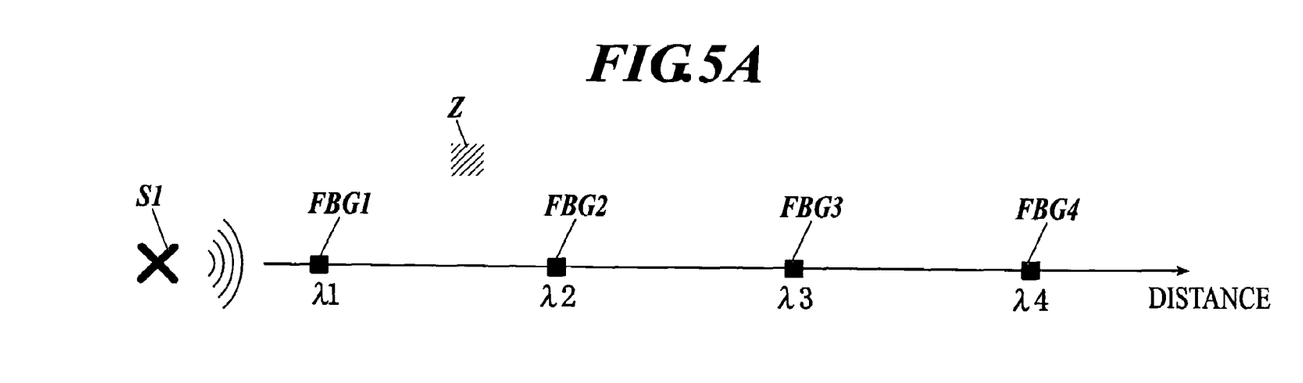
FIG. 5A is a plan view showing an example of the arrangement of each optical fiber sensor in an embodiment of the present invention.
Figure 5B:
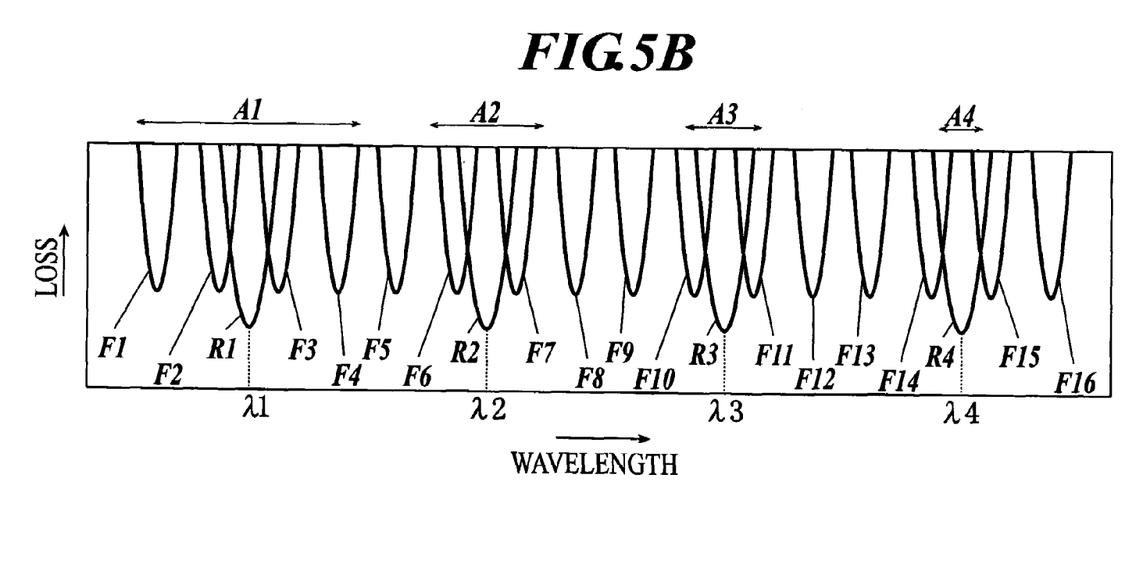
FIG. 5B is a spectrum diagram showing the pass bands of the optical filters corresponding to the arrangement of FIG. 5A and a wavelength distribution of a reflected light.

As shown in FIG. 5A, one optical fiber in which 10 optical fiber sensors FBG1-FBG10 are formed is drawn around, and the optical fiber sensors FBG1-FBG10 (FBG5-FBG10 are not shown) are thus installed in the composite material structure Z at intervals. The output terminal of the reflected light of the optical fiber is connected to the input port P0. The center wavelengths of the optical fiber sensors FBG1-FBG10 are denoted by λ1-λ10, respectively. The wavelength bands R1-R10 (R5-R10 are not shown) of the respective optical fiber sensors FBG1-FBG10 having the center wavelengths λ1-λ10, respectively, are distributed at regular intervals to be distant from each other to the degree or more at which the vibration bands of the detection objects are not overlapped with each other as shown in FIG. 5B. Moreover, as shown in FIG. 5B, the pass bands (for example, F1-F4) of the four optical filters corresponding to one optical fiber sensor are distributed in the vibration band, which is the detection object, of the corresponding optical fiber sensor at regular intervals over the center wavelength (λ1 to F1-F4) at the time of no impact loading on the corresponding one optical fiber sensor.

Figure 6:
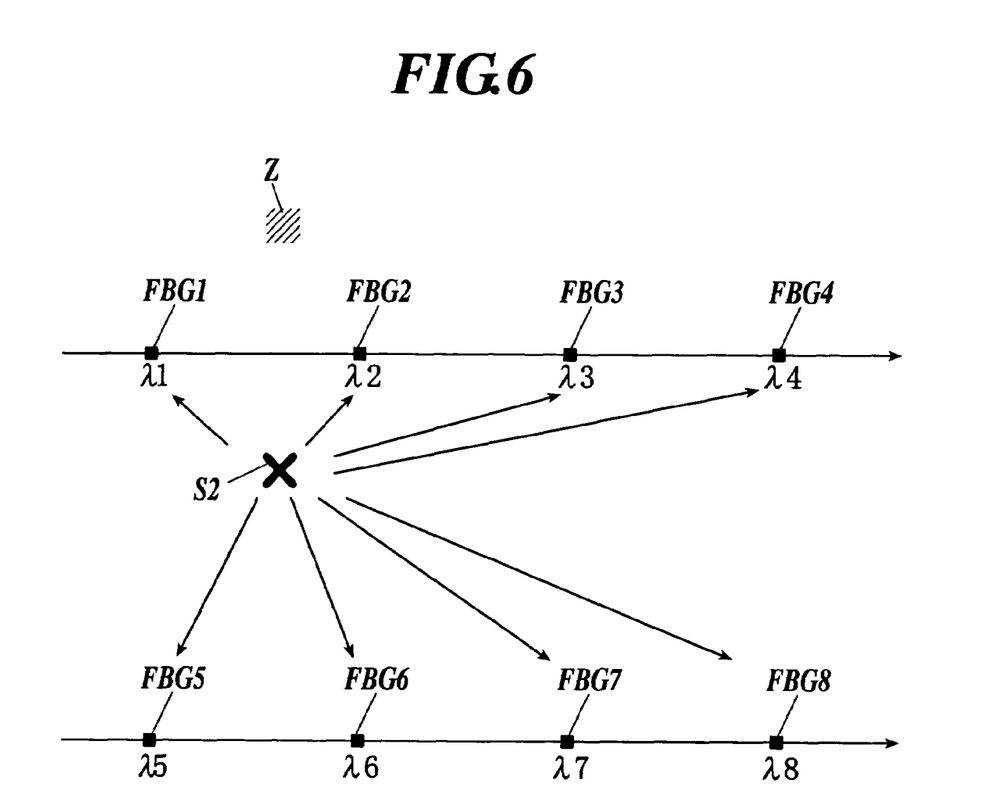
FIG. 6 is a plan view showing another example of the arrangement of each optical fiber sensor in the embodiment of the present invention.
Figure 7:
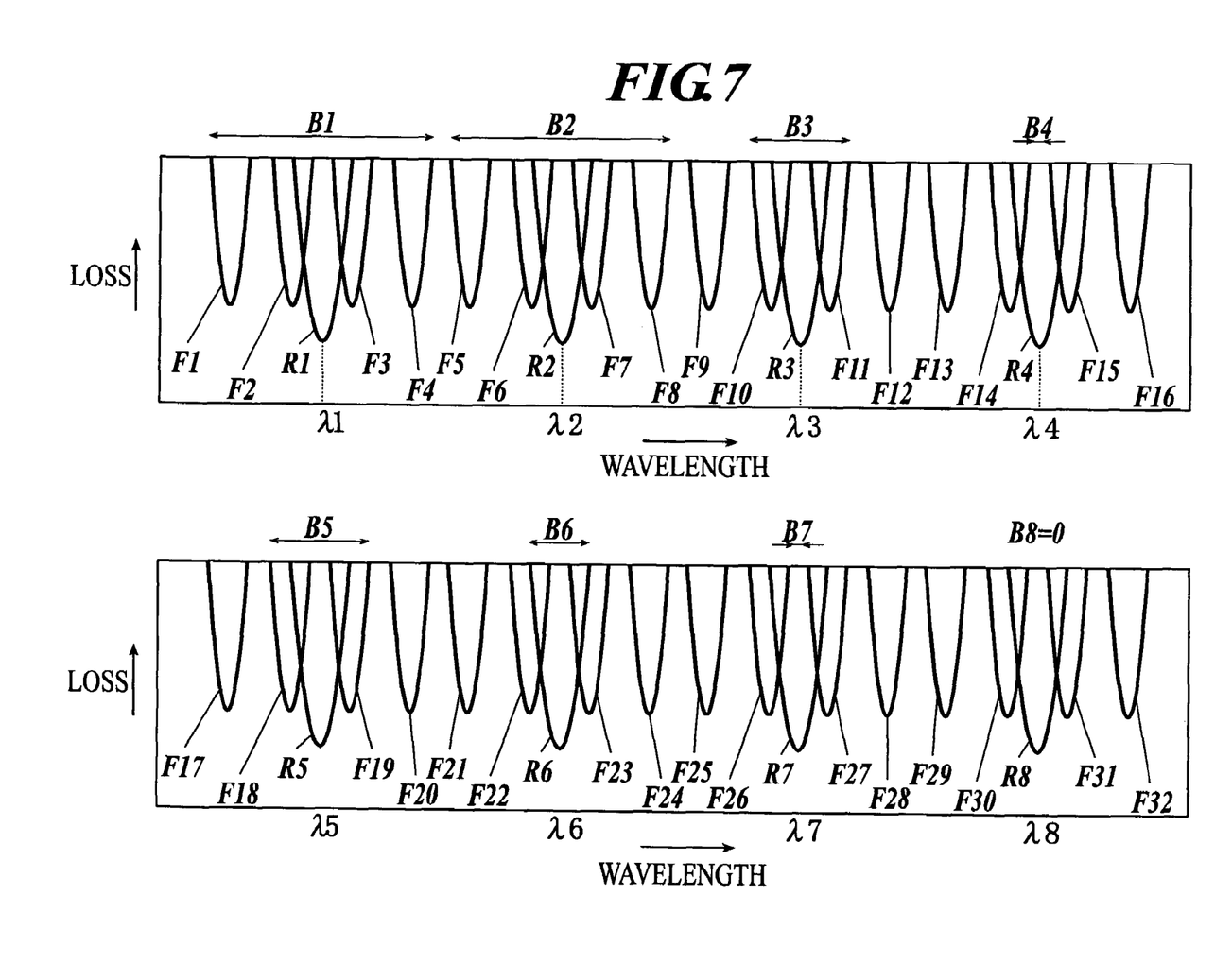
FIG. 7 is a spectrum diagram showing the pass bands of the optical filters corresponding to the arrangement of FIG. 6 and a wavelength distribution of the distribution bands of reflected lights.

Alternatively, as shown in FIG. 6, one optical fiber in which 10 optical fiber sensors FBG1-FBG10 are formed is drawn around, and the optical fiber sensors FBG1-FBG10 (FBG9 and FBG10 are not shown) are thus installed in the composite material structure Z at intervals. The output terminal of the reflected light of the optical fiber is connected to the input port P0. The center wavelengths of the optical fiber sensors FBG1-FBG10 are denoted by λ1-λ10, respectively. The wavelength bands R1-R10 (R9 and R10 are not shown) of the respective optical fiber sensors FBG1-FBG10 having the center wavelengths λ1-λ10, respectively, are distributed at regular intervals to be distant from each other to the degree or more at which the vibration bands of the detection objects are not overlapped with each other as shown in FIG. 7. Moreover, as shown in FIG. 7, the pass bands (for example, F1-F4) of the four optical filters corresponding to one optical fiber sensor are distributed in the vibration band, which is the detection object, of the corresponding optical fiber sensor at regular intervals over the center wavelength (λ1 to F1-F4) at the time of no impact loading on the corresponding one optical fiber sensor.

The arithmetic processing unit stores the position coordinates of the optical fiber sensors FBG1-FBG10, and the center wavelengths λ1-λ10 in association with each other.

The vibration band of a detection object to be trapped of an optical fiber sensor, the number m of the optical filters corresponding to one optical fiber sensor, and the distribution intervals of the optical filters are determined as follows, for example.

The strain level in the generation of an impact damage that cannot be seen by eyes and causes a problem in an FRP composite material is in a range from about 300με to about 500με. In order to set the strain level of 1000με of being about twice as large as the range as the maximum detectable strain, it is necessary to trap the vibration band of 1.0 nm.

In this case, in order to detect an impact with high accuracy, it is better to use the AWG module having channels having the intervals of 0.2 nm (equivalent to 166με) or the intervals of 0.4 nm (equivalent to 333με), which channels make it possible to grasp a change of 300με at the minimum. In the case of using the AWG module having the channels of the intervals of 0.2 nm, the usage means to select m=6. In the case of using the AWG module having the channels of the intervals of 0.4 nm, the usage means to select m=3. It is a matter of course that the number m of the optical filters may be selected as 4 or 5, and may be selected as 7 or more. If the number m of the optical filters is set to be large, the detection of a change of a reflected light becomes higher accurate. On the other hand, the scale of the AWG module becomes large.

As the light source, the one having a band wider than the degree of including the vibration bands of the detection objects of all the optical fiber sensors to be used is used.

Moreover, it becomes possible to detect an impact applied to the composite material structure Z, which is the subject to be inspected, at an arbitrary time by using the AWG module in the state in which all the channels thereof can always perform detection.

For example, when an impact S1 is applied to the composite material structure Z in the configuration shown in FIG. 5A, wavelength vibrations having different amplitudes A1, A2, A3, A4, . . . are produced in the respective optical fiber sensors FBG1-FBG10 as shown in FIG. 5B. In this example, the relative sizes of the amplitudes are as follows: A1>A2>A3>A4.

Alternatively, when an impact S2 is applied to the composite material structure Z in the configuration shown in FIG. 6, wavelength vibrations having different amplitudes A1, A2, A3, A4, . . . are produced in the respective optical fiber sensors FBG1-FBG10 as shown in FIG. 7.

When the phenomena mentioned above are produced, all the output ports of the AWG module outputs output values including various kinds of information, such as the existence of an output, the nonexistence of any outputs, the existence of time changes of an output value, the nonexistence of any time changes of an output value, and further the situation of the time changes, to the arithmetic processing unit.

The arithmetic processing unit can measure the energy levels of the elastic waves that have arrived at the respective optical fiber sensors FBG1-FBG10 by synthesizing the output values of the AWG module obtained by such a way. The arithmetic processing unit calculates the existence of an impact, the position where the impact has bee applied, and the magnitude (energy level) of the impact, on the basis of these pieces of information.

More optical fibers and more spectrum analyzers are installed according to the scale of the composite material structure Z, and are connected to the common arithmetic processing unit.

According to the embodiment of the present invention, one optical fiber in which a plurality of sensor sections is formed is used as a detection device; the wavelength bands of the respective sensor sections in the one optical fiber are distributed in the state of being respectively more distant to the degree at which any vibration bands do not overlap on each other; and the pass bands of three or more optical filters corresponding to one optical sensor are distributed in the vibration band of the corresponding one optical sensor over the center wavelength at the time of no impact loading to the corresponding one optical fiber sensor. Consequently, the changes of a reflected light from the one vibrating large to the one vibrating small are separated every sensor and are grasped by three or more filters. The changes are thereby correctly and sufficiently grasped, and the existence, the position, and the magnitude of an arbitrary impact can be specified with high accuracy.

Preferably, the system includes m×n pieces of the optical filters where m represents the number of the optical filters corresponding to each one of the sensor sections and is an integer of three or more, and n represents the number of the sensor sections included in one optical fiber and is an integer of two or more, and the m×n pieces of the optical filters are configured as a single arrayed waveguide grating (AWG) filter module including m×n channels or more.

By this feature, one optical fiber having a plurality of optical fiber sensors is connected to an arrayed waveguide grating type optical filter module, and necessary optical filters can be equipped. By using a lightwave circuit, in which many optical filters are integrated, of the arrayed waveguide grating type optical filter module, the system configuration can be miniaturized and simplified even if many optical filters are necessary.

The entire disclosure of Japanese Patent Application No. 2006-326013 filed on Dec. 1, 2007 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. An impact detection system, comprising:
   an optical fiber including a core portion, the core portion including a plurality of sensor sections each provided with a grating portion, in which the grating portion is provided with a plurality of gratings each reflecting light, a wavelength band of reflected light changes when a distance between adjacent gratings changes, and the optical fiber vibrates the wavelength band depending on an elastic wave propagating through a subject to be inspected;

a light source to input light into the core portion of the optical fiber, in which a spectrum bandwidth of the light includes vibration bands of wavelength bands of the sensor sections;

optical filters each connected to an output terminal of the optical fiber, from which output terminal the reflected light is output; and an arithmetic processing unit to perform arithmetic processing of output values of the plurality of sensor sections through the optical filters, so as to detect an impact to the subject by measuring energy levels of elastic waves that arrive at respective optical fiber sensors, said measuring being performed by synthesizing said output values, said output values comprising information on an existence of an output, nonexistence of any outputs, an existence of time changes of an output value, nonexistence of any time changes of an output value, and a situation of time changes, wherein the wavelength bands of the sensor sections in the optical fiber are distributed to be apart from each other such that the vibration bands do not overlap with each other, and wherein pass bands of the optical filters corresponding to one of the sensor sections are distributed in the vibration band of the one sensor section, and are distributed in both sides of a center of the wavelength band of the one sensor section under no impact loaded.

2. The impact detection system according to claim 1, wherein three or more optical filters, each having different pass bands, correspond to each one of the sensor sections.

3. The impact detection system according to claim 1, wherein the arithmetic processing unit specifies at least one of a position and a magnitude of the impact loaded on the subject.

4. The impact detection system according to claim 1, wherein the system includes m×n pieces of the optical filters where m represents the number of the optical filters corresponding to each one of the sensor sections and is an integer of three or more, and n represents the number of the sensor sections included in one optical fiber and is an integer of two or more, and wherein the m×n pieces of the optical filters are configured as a single arrayed waveguide grating (AWG) filter module including m×n channels or more.

5. The impact detection system according to claim 1, wherein the arithmetic processing unit specifies a magnitude of the impact loaded on the subject.

6. The impact detection system according to claim 1, wherein the grating portion selectively reflects only a light having a specific wavelength at boundary parts where a refraction index changes.

7. The impact detection system according to claim 1, further comprising a spectrum analyzer, wherein the spectrum analyzer comprises:

the light source;
an optical circulator;
an arrayed waveguide grating (AWG) module; and
a photoelectric transducer.

8. The impact detection system according to claim 7, wherein the optical circulator causes a light from the light source to travel to a side of the sensor sections of the optical fiber, and guides reflected lights returned from the sensor sections to an input port of the AWG module.

9. The impact detection system according to claim 7, wherein the AWG module comprises an AWG board, and
wherein a lightwave circuit monolithically integrated on a glass substrate is formed on the AWG board.

10. The impact detection system according to claim 7, wherein outputs of the spectrum analyzer receive an A/D conversion through an interface, and are input into the arithmetic processing unit.

11. The impact detection system according to claim 8, wherein the reflected lights guided by the optical circulator are introduced into the input port of the AWG module by an optical fiber.

12. The impact detection system according to claim 8, wherein the optical filters are connected to the input port in parallel with one another, and
wherein the optical filters have different pass bands.

13. The impact detection system according to claim 9, wherein the lightwave circuit comprises:
input and output slab waveguides;
an arrayed waveguide; and
an output waveguide.

14. The impact detection system according to claim 9, wherein the lightwave circuit on the AWG board separates a multiplexed-wavelength input light into lights having respective wavelengths by passing the multiplexed-wavelength input light through the optical filters, and outputs the lights in parallel with one another to a plurality of output ports.

15. An impact detection system, comprising:
an optical fiber including a core portion, the core portion including a plurality of sensor sections each provided with a grating portion, in which the grating portion is provided with a plurality of gratings each reflecting light, a wavelength band of reflected light changes when a distance between adjacent gratings changes, and the optical fiber vibrates the wavelength band depending on an elastic wave propagating through a subject to be inspected;

a light source to input light into the core portion of the optical fiber, in which a spectrum bandwidth of the light includes vibration bands of wavelength bands of the sensor sections;

optical filters each connected to an output terminal of the optical fiber, from which output terminal the reflected light is output; and an arithmetic processing unit to perform arithmetic processing of output values of the plurality of sensor sections through the optical filters, so as to detect an impact to the subject, wherein the wavelength bands of the sensor sections in the optical fiber are distributed to be apart from each other such that the vibration bands do not overlap with each other, wherein pass bands of the optical filters corresponding to one of the sensor sections are distributed in the vibration band of the one sensor section, and are distributed in both sides of a center of the wavelength band of the one sensor section under no impact loaded, and wherein the arithmetic processing unit stores position coordinates of the sensors sections in the optical fiber, and center wavelengths of the sensors sections in association with each other.

16. The impact detection system according to claim 15, wherein the arithmetic processing unit detects the impact to the subject by measuring energy levels of elastic waves that arrive at respective optical fiber sensors, said measuring being performed by synthesizing said output values, said output values comprising information on an existence of an output, nonexistence of any outputs, an existence of time changes of an output value, nonexistence of any time changes of an output value, and a situation of time changes.

17. An impact detection system, comprising:
an optical fiber including a core portion, the core portion comprising a plurality of sensor sections each provided with a grating portion, in which the grating portion is provided with a plurality of gratings each reflecting light, a wavelength band of reflected light changes when a distance between adjacent gratings changes, and the optical fiber vibrates the wavelength band depending on an elastic wave propagating through a subject to be inspected;
a light source to input light into the core portion of the optical fiber, in which a spectrum bandwidth of the light includes vibration bands of wavelength bands of the sensor sections;
optical filters each connected to an output terminal of the optical fiber, from which output terminal the reflected light is output;
an arithmetic processing unit to perform arithmetic processing of output values of the plurality of sensor sections through the optical filters, so as to detect an impact to the subject by measuring energy levels of elastic waves that arrive at respective optical fiber sensors, said measuring being performed by synthesizing said output values, said output values comprising information on an existence of an output, nonexistence of any outputs, an existence of time changes of an output value, nonexistence of any time changes of an output value, and a situation of time changes; and
a spectrum analyzer,
wherein the wavelength bands of the sensor sections in the optical fiber are distributed to be apart from each other such that the vibration bands do not overlap with each other,
wherein the arithmetic processing unit specifies a magnitude and a position of the impact loaded on the subject, and
wherein the grating portion selectively reflects only a light having a specific wavelength at boundary parts where a refraction index changes.

18. The impact detection system according to claim 17, wherein pass bands of the optical filters corresponding to one of the sensor sections are distributed in the vibration band of the one sensor section, and are distributed in both sides of a center of the wavelength band of the one sensor section under no impact loaded.

19. The impact detection system according to claim 17, wherein the spectrum analyzer comprises:
the light source;
an optical circulator;
an arrayed waveguide grating (AWG) module; and
a photoelectric transducer,
wherein the optical filters are connected to an input port of the AWG module in parallel with one another, and
wherein the optical filters have different pass bands.

20. The impact detection system according to claim 17, wherein the arithmetic processing unit stores position coordinates of the sensors sections in the optical fiber and center wavelengths of the sensors sections in association with each other.

* * * * *